S. McGAW.
VEHICLE BRAKE.
APPLICATION FILED JULY 2, 1909.
956,402.
Patented Apr. 26, 1910.
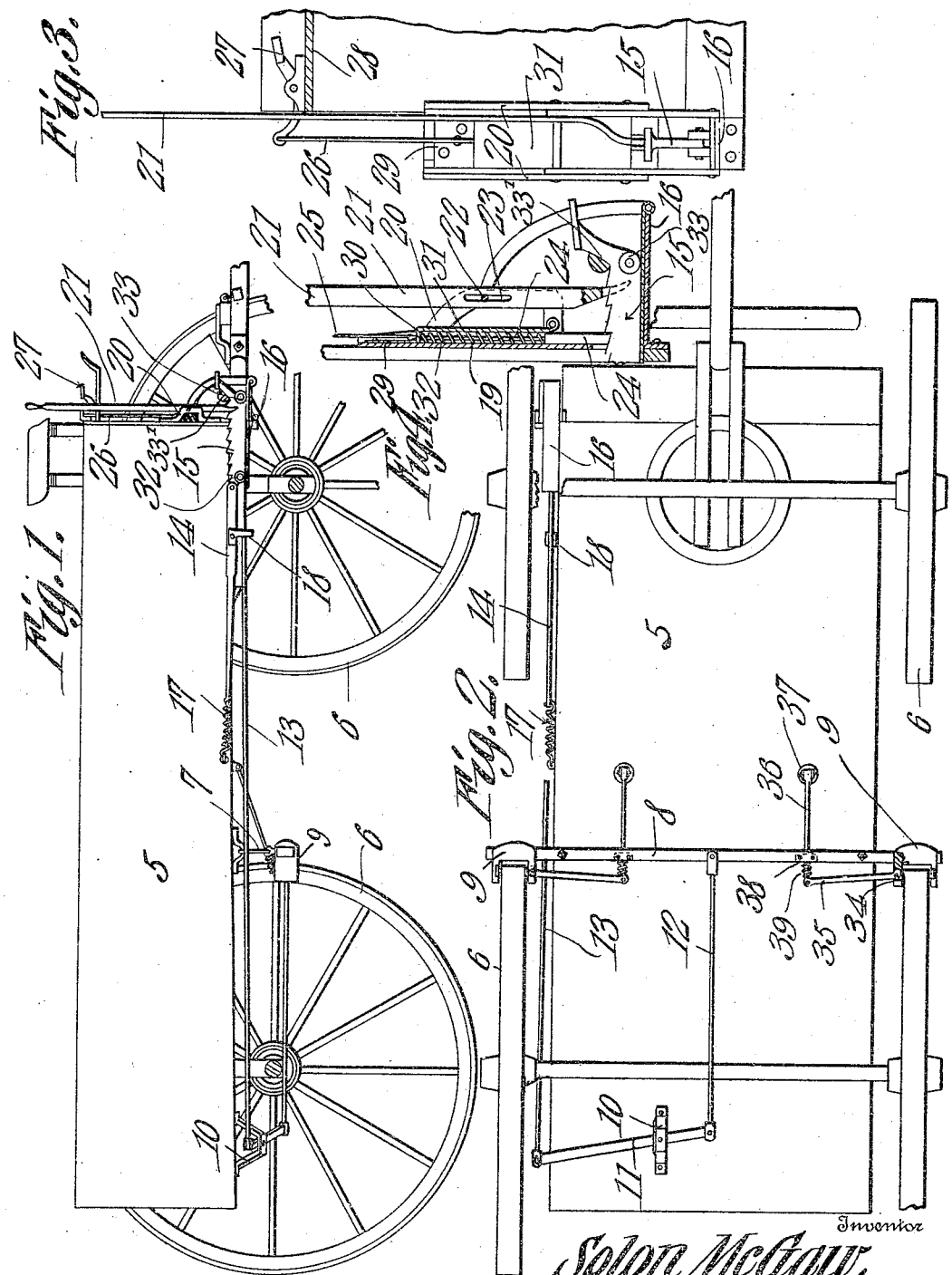
Inventor
Solon McGaw.
Witnesses
By C. A. Snow & Co.
Attorneys

UNITED STATES PATENT OFFICE.

SOLON McGAW, OF DECATUR, ALABAMA, ASSIGNOR OF ONE-HALF TO THOMAS GARTH, OF DECATUR, ALABAMA.

VEHICLE-BRAKE.

956,402.  Specification of Letters Patent.  Patented Apr. 26, 1910.

Application filed July 2, 1909. Serial No. 505,686.

*To all whom it may concern:*

Be it known that I, SOLON McGAW, a citizen of the United States, residing at Decatur, in the county of Morgan and State of Alabama, have invented a new and useful Vehicle-Brake, of which the following is a specification.

This invention has for its object to provide a simple, powerful and easily applied brake for vehicles, and it consists in a novel construction and arrangement of parts, to be hereinafter described and claimed.

The invention also has for its object to equip the brake shoe with an improved auxiliary brake mechanism which automatically grips the side of the wheel-rim when the shoe moves into contact with the wheel tire.

In the accompanying drawing:—Figure 1 is an elevation of a wagon provided with my brake. Fig. 2 is a bottom plan view. Fig. 3 is a front elevation of the brake-operating devices. Fig. 4 is a vertical section thereof.

Referring more particularly to the drawing, 5 denotes the body of the wagon, and 6 are the wheels thereof.

From the bottom of the wagon body is suspended by means of links 7, a brake beam 8, carrying at its ends brake shoes 9, the beam being so located that the shoes may engage the hind wheels of the wagon. On the bottom of the wagon-body is mounted a bracket 10 to which is fulcrumed a brake lever 11 connected to the beam by a rod 12. The brake lever is also connected by a rod 13 to a link 14, which is connected to a rack-bar 15 slidably mounted on a suitable supporting bracket 16 carried at the front end of the wagon. The link 14 is connected at one of its ends to the rear end of the rack-bar, and to its opposite end is connected one end of a coiled spring 17, the other end of said spring being made fast to the side of the wagon-body. The front end of the rod 13 is attached to bracket 18 which is adjustably secured to the link 14 by a set screw inserted through its side and bearing against the link.

By the herein described system of links and lever, it will be evident that the brake is applied upon sliding the rack-bar 15 forwardly, and when the rack-bar is released the spring 17 pulls it rearwardly and releases the brake.

On the front end of the wagon is mounted a plate 19, to which are bolted or otherwise secured spaced bracket arms 20, which extend outwardly from the plate in a curve. Between these arms is fulcrumed a hand lever 21, having its lower end forked to straddle the rack-bar 15, and to engage the teeth thereof, said teeth being made in the top edge of the rack-bar. The upper end of the lever extends to the seat of the wagon, so as to be within easy reach of the driver. The function of this lever is to slide the rack-bar forwardly to apply the brake, which is done by swinging the lever on its fulcrum. The fulcrum of the lever is a pin 22, carried by the arms 20, and extending therebetween. The pin passes through a slot 23 in the lever, in order that the latter may be disengaged from the rack-bar.

A pawl is also provided for locking the rack-bar, 15. This pawl comprises a head 24 carried by a stem 25, which is connected by a rod or wire 26 to a foot lever 27 mounted on the foot-rest 28 of the wagon-seat. To the plate 19, between the arms 20, is bolted or otherwise secured a plate 29, having an outward bend 30 to form an off-set portion 31, which is secured at its end to the arms 20. This plate forms a housing for a spring 32 which is coiled around the stem 25, between the bend 30 and the head 24. In the bend is an opening through which the stem 25 passes. The pawl is located so as to engage the teeth of the rack-bar, it being held normally in engagement therewith by the spring 32. Upon pressing on the foot-lever 27, the pawl is lifted off the rack bar and the latter is then released, and may be slid forwardly by the hand-lever 21 to apply the brake as already described. The rack-bar 15 is fitted with anti-friction rollers 33, which travel on the bracket 16, and also with a rubber or other elastic buffer 33' which cushions the jar or shock of the head of the rack bar against the lever on the rearward movement of the rack bar. In the plate 19 is an opening through which the rack-bar passes, and which serves to hold it in place on the bracket.

Each brake-shoe has a recessed face into which the wheel-rim extends. The inner end of the recess engages the tire, and in one of the side walls of the recess is mounted a cam clamp 34 for engaging one side of the wheel-rim. This clamp is pivotally mounted in an opening made in said wall, and it is formed on a lever 35, which is connected at its outer end to one end of a link 36, pivotally connected at its opposite end to the bottom of the wagon body, as indicated at 37. The lever 35 extends in the direction of the length of the brake beam, and the link 36 extends transversely thereof, and also forwardly from the brake-beam to a point a short distance in front thereof. On the brake-beam is the guide 38, through which the link 36 loosely passes. Between this guide and the end of the lever 35, a spring 39 is coiled around the link 36, the function of said spring being to assist the release of the cam clamp 34 when the brake is thrown off.

Each brake shoe will be equipped with the herein described auxiliary brake mechanism, and said mechanism operates automatically when the shoes move in the direction of the wheel rim, the links 36 causing the cams to swing on their pivots and to engage the sides of the wheel rim.

What is claimed is:—

1. In a brake, a beam, a shoe carried thereby, the face of the shoe having a recess in which recess the wheel rim is adapted to extend, a clamp carried by the shoe, and automatically engageable with the side of the wheel rim when the shoe is engaged with the wheel.

2. In a brake, a beam, a shoe carried thereby, the face of the shoe having a recess into which recess the wheel rim is adapted to extend, a clamp carried by the shoe to engage the side of the wheel rim, and means for applying the said clamp simultaneously with the brake shoe.

3. In a brake, a beam, a shoe carried thereby, the face of the shoe having a recess into which the wheel rim is adapted to be seated, a cam lever pivotally mounted on the shoe to engage the side of wheel rim, and a link connected at one end to the lever, and at the other end to the vehicle body.

4. In a brake, a beam, a shoe carried thereby, the face of the shoe having a recess, into which recess the wheel rim is adapted to extend, a cam lever pivotally mounted on the shoe to engage the side of the wheel rim, said lever extending in the direction of the length of the brake beam, and a link connected at one end to the lever, and at the other end to the vehicle body, said link extending transversely of the brake beam and being connected to the vehicle body in front thereof.

In testimony that I claim the foregoing as my own, I have hereto affixed my signature in the presence of two witnesses.

SOLON McGAW.

Witnesses:
J. J. SYKES,
ED DEVINE.